United States Patent
Ward

(10) Patent No.: US 10,850,488 B2
(45) Date of Patent: Dec. 1, 2020

(54) FLATBED LAMINATOR WITH A PAIR OF ROLLERS

(71) Applicant: Vivid Laminating Technologies Ltd, Ashby de la Zouch (GB)

(72) Inventor: Gavin Ward, Ashby de la Zouch (GB)

(73) Assignee: Vivid Laminating Technologies Ltd, Ashby de la Zouch (GB)

( * ) Notice: Subject to any disclaimer, the term of this patent is extended or adjusted under 35 U.S.C. 154(b) by 0 days.

(21) Appl. No.: 16/722,352

(22) Filed: Dec. 20, 2019

(65) Prior Publication Data

US 2020/0198314 A1 Jun. 25, 2020

(30) Foreign Application Priority Data

Dec. 20, 2018 (GB) .................................. 1820813.2

(51) Int. Cl.
*B32B 37/00* (2006.01)

(52) U.S. Cl.
CPC ................................ *B32B 37/0053* (2013.01)

(58) Field of Classification Search
USPC ................................................ 156/580, 582
See application file for complete search history.

(56) References Cited

U.S. PATENT DOCUMENTS

| | | | |
|---|---|---|---|
| 6,102,096 A * | 8/2000 | Johansson | B32B 38/185 |
| | | | 156/353 |
| 6,688,364 B2 * | 2/2004 | Simpson | B44C 1/10 |
| | | | 156/230 |
| 9,016,344 B2 * | 4/2015 | Hansen | B29C 63/024 |
| | | | 156/510 |
| 2014/0090784 A1 | 4/2014 | Hansen | |

FOREIGN PATENT DOCUMENTS

| | | |
|---|---|---|
| CN | 202556853 U | 11/2012 |
| GB | 2099362 A | 12/1982 |
| GB | 2544805 A | 5/2017 |

OTHER PUBLICATIONS

UKIPO, Search Report for GB Patent Application No. 1820813.2, dated Apr. 8, 2019, 4 pages.
EPO, Extended European Search Report for European Patent Application No. 19216929.0, dated May 11, 2020, 5 pages.

* cited by examiner

*Primary Examiner* — James D Sells
(74) *Attorney, Agent, or Firm* — NK Patent Law

(57) ABSTRACT

A flatbed laminator is described that can be used for flatbed lamination and roller lamination of a workpiece. The flatbed laminator comprises a flatbed. The flatbed laminator also comprises a first roller and a second roller. The second roller is mounted to be movable over the flatbed for flatbed lamination of the workpiece. The second roller is movable to a pre-determined laminating position where the first and second rollers are mounted in parallel for counter rotation and define a gap therebetween through which the workpiece is capable of being fed for roller lamination.

15 Claims, 2 Drawing Sheets

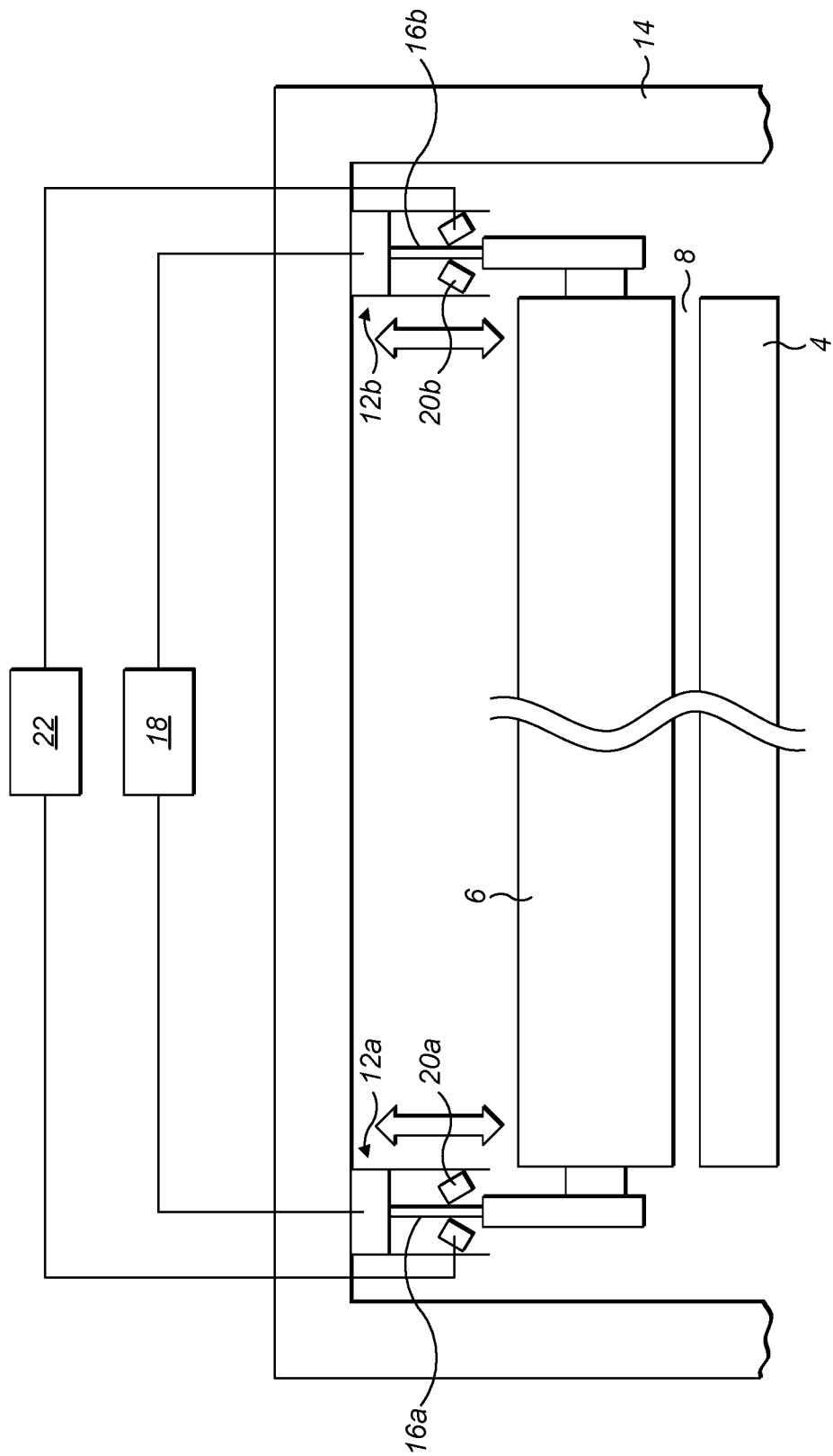

FLATBED LAMINATOR WITH A PAIR OF ROLLERS

CROSS-REFERENCE TO RELATED APPLICATION(S)

This application claims priority to United Kingdom Patent Application No. 1820813.2 filed on Dec. 20, 2018, the entire content of which is incorporated by reference herein.

TECHNICAL FIELD

The invention relates to flatbed laminators in which a workpiece to be laminated, or on which a vinyl coating or other similar coating is to be adhered, is placed on a flatbed and a roller is rolled over the workpiece. In the flatbed laminator of the invention, the workpiece to be laminated may alternatively be fed through a gap between a pair of parallel, counter-rotating rollers of the flatbed laminator. The workpiece may comprise a sheet to be laminated together with laminating film to be applied to a surface of the sheet, or it may comprise a mounting such as a foam board, and a coating to be adhered to the mounting, such as a vinyl layer. The gap between the roller and the flatbed and/or between the pair of rollers can be adjusted according to the thickness of the workpiece in order that the desired pressure may be applied during the respective laminating process.

BACKGROUND OF THE INVENTION

The roller of a conventional flatbed laminator is mounted such that it can be moved towards or away from the flatbed in order to adjust the size of the gap between them. It is also mounted such that it can be rolled along the flatbed. The roller is normally arranged above the flatbed so that a workpiece can be positioned on the flatbed. Means are provided for lowering the roller until it comes into contact with a workpiece positioned on the flatbed and presses the workpiece against the flatbed and then rolling the roller along the flatbed such that the entire workpiece is laminated.

In the case of a completely different type of laminator with a pair of counter-rotating rollers, a first roller is fixed in position and a second roller is mounted such that it can be moved towards or away from the first roller in order to adjust the size of the gap between them. The second roller is normally arranged above the first roller so that the workpiece rests on the first roller, which is driven to rotate. Means are provided for lowering the second roller until it comes into contact with the workpiece and presses the workpiece against the first roller. At the end of the process the second roller is raised to release the workpiece or to reset the laminator.

Flatbed laminators are good for laminating certain types of workpiece because the workpiece can be positioned on the flatbed in a stable way while the roller is being rolled along the workpiece. But the length of the workpiece that can be laminated is limited by the length of the flatbed. On the other hand, laminators where the workpiece to be laminated is fed through a gap between a pair of parallel, counter-rotating rollers do not have any limit on the length of the workpiece. The length of the workpiece is its dimension in the laminating direction along which the roller of the flatbed laminator moves along the workpiece, or along which the workpiece is fed through the gap between the rollers.

SUMMARY OF THE INVENTION

The flatbed laminator according to the present invention combines the advantages of the different types of laminator known in the prior art into a single laminating machine. The flatbed laminator is a "dual purpose" laminator. In particular, the present invention provides a flatbed laminator for laminating a workpiece, the flatbed laminator comprising:
 a flatbed on which the workpiece can be positioned for flatbed lamination;
 a first roller; and
 a second roller mounted to be movable over the flatbed for flatbed lamination of the workpiece, and to be movable to a pre-determined laminating position where the first and second rollers are mounted in parallel for counter rotation and define a gap therebetween through which the workpiece is capable of being fed for roller lamination.

This means that the flatbed laminator can be used for both types of lamination described above—namely "flatbed lamination" where the second roller is moved horizontally along the flatbed to laminate a workpiece that is positioned on the flatbed, and "roller lamination" where the second roller is retained in the pre-determined laminating position, which is normally directly over the first roller, and where the workpiece is fed through a gap between the parallel, counter-rotating, first and second rollers.

The second roller is preferably mounted such that it can be moved towards or away from the flatbed (i.e., it can be raised or lowered relative to the flatbed) in order to adjust the size of the gap between them. It is also preferably mounted such that it can be moved horizontally along the flatbed and rolls along the surface of the workpiece during flatbed lamination. The second roller is arranged above the flatbed so that a workpiece can be positioned on the flatbed. Means can be provided for lowering the second roller until it comes into contact with a workpiece positioned on the flatbed and presses the workpiece against the flatbed and then rolling the second roller horizontally along the flatbed such that the workpiece is laminated.

The second roller can be mounted on a horizontal movement assembly that can move relative to the flatbed along a laminating direction that is parallel with a longitudinal axis of the flatbed. The horizontal movement assembly can be mounted to move backwards and forwards along tracks or rails provided on the flatbed frame, for example. The second roller can be mounted to the horizontal movement assembly by a vertical movement assembly for raising and lowering the second roller relative to the flatbed. The vertical movement assembly can move as part of the horizontal movement assembly. The ends of the second roller can be supported by the vertical movement assembly. The vertical movement assembly can include a pair of pneumatic cylinders, hydraulic cylinders, or mechanical actuators that can raise and lower the second roller, for example. In one arrangement, where the vertical movement assembly includes a pair of pneumatic cylinders connected to a pressurised air source, for example, the body of the pneumatic cylinders can be fixed to the horizontal movement assembly (e.g., to a movable frame or gantry) and the piston rods that reciprocate within the pneumatic cylinders can be fixed to the ends of the second roller or vice versa.

When it is in the pre-determined laminating position, the second roller is preferably also mounted such that it can be moved towards or away from the first roller (i.e., it can be raised or lowered relative to the first roller) in order to adjust the size of the gap between them. In the pre-determined laminating position, the second roller is normally arranged directly above the first roller and the workpiece rests on the first roller. Means (e.g., the vertical movement assembly mentioned above) can be provided for lowering the second roller in the pre-determined laminating position until it comes into contact with the workpiece and presses the workpiece against the first roller. At the end of the process the second roller is raised (e.g., by the vertical movement assembly) to release the workpiece or to reset the laminator.

The first roller can be positioned at an end of the flatbed. The first roller can be arranged such that the gap between the first and second rollers during roller lamination is aligned substantially with the surface of the flatbed so that, as the workpiece is fed through the gap between the first and second rollers, it can move on to and be supported by the adjacent flatbed. The first roller can be movable between a storage position (e.g., so that it is out of the way when the flatbed laminator is being used for flatbed lamination of the workpiece and the first roller is not needed) and a pre-determined laminating position where it can be used for roller lamination. If the first roller is movable, it can be selectively retained in the pre-determined laminating position by a first retaining assembly.

The flatbed laminator can further comprise a second retaining assembly that can be operated to selectively retain the second roller in the pre-determined laminating position over the first roller. In other words, the second retaining assembly will prevent the second roller from moving horizontally along the flatbed—e.g., by locking the horizontal movement assembly—but will not normally prevent the second roller from being raised or lowered to adjust the gap between the first and second rollers.

When the flatbed laminator is to be used for roller lamination of the workpiece, both the first and second rollers can be moved to their respective pre-determined laminating positions, optionally selectively retained by their respective retaining assemblies, and the gap between them can be adjusted by moving the second roller towards or away from the fixed first roller, e.g., by operating the vertical movement assembly that supports the second roller.

The first roller can be a driven roller.

The second roller can be a driven roller. In particular, the second roller can be driven to roll along the flatbed on top of the workpiece that is positioned on the flatbed for flatbed lamination and can be driven for counter rotation with the first roller when retained in the pre-determined laminating position for roller lamination.

The flatbed laminator can further comprise a locking assembly that can be operated to prevent movement of the second roller towards the flatbed or the first roller, e.g., by locking the vertical movement assembly. For example, if the vertical movement assembly comprises a pair of pneumatic cylinders, on which respective ends of the second roller are supported, the locking assembly can comprise a pair of mechanical locks that engage with the respective piston rods to prevent movement of the second roller towards the flatbed or the first roller. Typically, operation of the locking assembly does not prevent movement of the second roller away from the flatbed or the first roller. For example, the mechanical locks that engage with the piston rods can be adapted to prevent relative movement between the piston rods and the pneumatic cylinders in a first direction but to permit relative movement between the piston rods and the pneumatic cylinders in a second direction, which is opposite the first direction.

The flatbed laminator of the present invention can comprise an integral locking assembly that can be operated to prevent the gap between the second roller and the flatbed or first roller reducing below a minimum size. This minimum size can take any value within a continuous range (or alternatively any of a large number of closely spaced discrete values). The value does not have to be chosen in advance but can be determined by the thickness of an actual workpiece.

The present invention permits the second roller to be brought into engagement with the workpiece at a relatively low pressure that will avoid crushing it. The locking assembly can then be operated and, if desired, the pressure can then be made higher during the laminating process, while the workpiece remains protected against crushing.

The means to adjust the gap between the second roller and the first roller or flatbed (e.g., the vertical movement assembly) is generally controllable independently from the means that rolls the second roller along the flatbed during flatbed lamination (e.g., the horizontal movement assembly). The horizontal movement assembly can move the second roller horizontally along the flatbed without adjusting the gap between the second roller and the flatbed: a constant gap will be maintained between the second roller and the flatbed, as determined by the vertical movement assembly to avoid crushing the workpiece.

DRAWINGS

FIG. 4 is a schematic front view of the flatbed and the second roller of the flatbed laminator of FIG. 1 showing horizontal and vertical movement assemblies.

Figure 1:
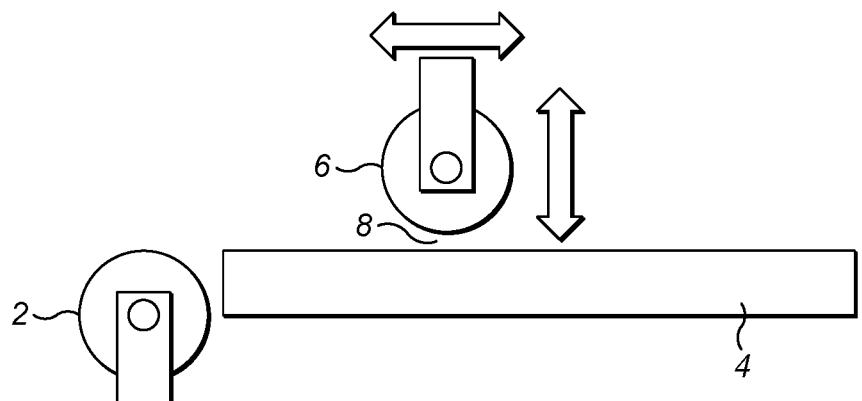
FIG. 1 is a schematic side view of a flatbed laminator according to the present invention with the second roller in position for flatbed lamination of a workpiece.
Figure 2:
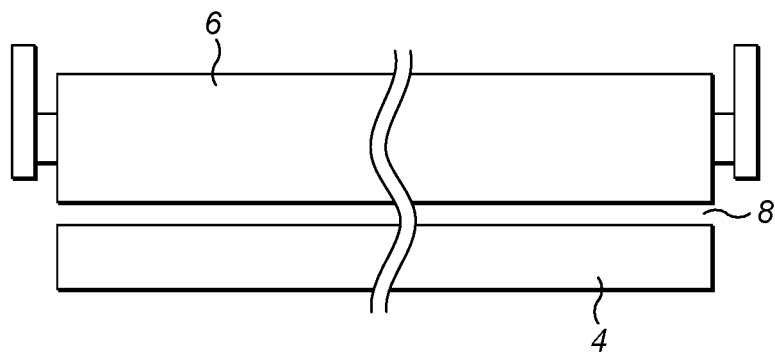
FIG. 2 is a schematic front view of the flatbed and the second roller of the flatbed laminator of FIG. 1.

As shown in FIGS. 1 to 4, a flatbed laminator in accordance with the invention comprises a first roller 2 arranged at an end of a flatbed 4. A second roller 6 is arranged parallel to and spaced apart from the flatbed 4. In FIGS. 2 and 4, the first roller has been omitted for clarity. The double wavy line indicates that the second roller 6 and the flatbed 4 may be of various lengths, including for use in a wide format laminator. The first roller 2 may also be of various lengths, including for use in a wide format laminator.

A movable frame or gantry 14 (omitted from FIGS. 1 to 3 for clarity, but shown in FIG. 4) acts as a horizontal movement assembly and is provided for moving the second roller 6 horizontally along the flatbed 4 in a laminating direction and for rolling the second roller over a workpiece (not shown) positioned on the flatbed 4 during flatbed lamination. The movable frame 14 can move in tracks or rails (not shown) provided on the stationary frame that supports the flatbed 4, for example.

The workpiece comprises a sheet of material to be laminated, having a film of laminating material in contact with an upper side of the sheet. Alternatively, the workpiece may comprise a sheet of material on which a vinyl layer is to be mounted with said vinyl layer in contact with an upper side of the sheet. The flatbed laminator can be used for any purpose for which a flatbed laminator according to the state of the art may be used. The flatbed laminator operates in a conventional manner by applying pressure, and optionally heat, to the workpiece as the second roller 6 is rolled over an upper side of the workpiece. The second roller 6 can therefore include a suitable heater or heating element (not shown).

In order to accommodate workpieces of different thicknesses, the size of a gap 8 between the second roller 6 and the flatbed 4 needs to be adjustable. The flatbed 4 is fixed in position. The second roller 6 is adjustable relative to flatbed 4 in such a way that the second roller can be moved towards or away from the flatbed 4 to change the size of the gap 8, while an axis of the second roller 6 is maintained parallel to the flatbed 4. In particular, with reference to FIG. 4, the ends of the second roller 6 can be mounted or supported by a vertical movement assembly that includes a pair of pneumatic cylinders 12a, 12b. The pneumatic cylinders 12a, 12b are fixed to the movable frame 14 that forms part of the horizontal movement assembly and which is adapted to move backwards and forwards over the flatbed 4 in a laminating direction. Piston rods 16a, 16b that reciprocate within the pneumatic cylinders 12a, 12b are fixed to the ends of the second roller 6 such that the second roller can be raised and lowered by activating the pneumatic cylinders, i.e., by supplying pressurised air from a pressurised air supply 18 in a known manner. The air pressure should be selected so that the second roller 6 does not crush the workpiece: for delicate workpiece materials such as foam board a relatively low pressure may be used.

Other means for raising and lowering the second roller relative to the frame 14 can also be used, e.g. hydraulic cylinders, mechanical actuators etc.

Figure 3:
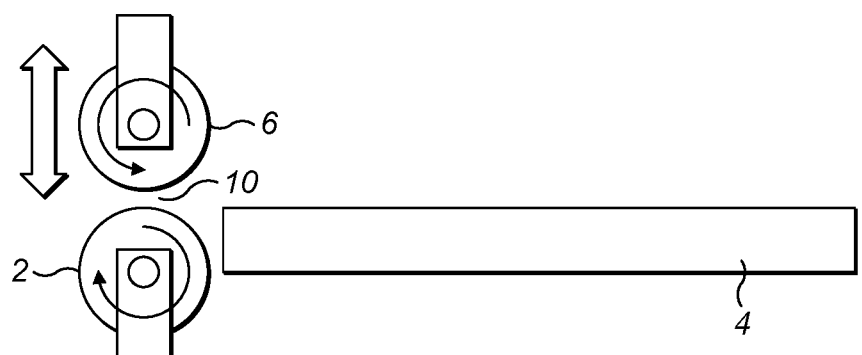
FIG. 3 is a schematic side view of the flatbed laminator of FIG. 1 with the second roller in a pre-determined lamination position for roller lamination of a workpiece.

The movable frame 14 allows the second roller 6 to be moved horizontally relative to the flatbed 4 to a pre-determined laminating position shown in FIG. 3 where the flatbed laminator can be used for roller lamination. In the pre-determined laminating position, the second roller 6 is arranged parallel to and spaced from the first roller 2 next to an end of the flatbed 4. Means (not shown) are provided for rotating one of the rollers and counter-rotating the other of the rollers to draw a workpiece (not shown) through the gap 10 between them. The flatbed laminator operates like a conventional laminator by applying heat and pressure to the layered workpiece as it passes between the first and second rollers 2, 6. During such a roller lamination process, the second roller 6 can be selectively retained in the pre-determined laminating position by a retaining assembly (not shown). The retaining assembly can prevent horizontal movement of the movable frame 14 relative to the flatbed 4, e.g., by mechanical locks.

In order to accommodate workpieces of different thicknesses, the size of the gap 10 between the first and second rollers 2, 6 needs to be adjustable. The mounting of the first roller 2 is fixed to the frame or body of the flatbed laminator so that the first roller always rotates about the same axis. (In another arrangement, the mounting of the first roller 2 allows it to be moved between a storage position where it is away from the end of the flatbed 4 and the fixed position shown in FIG. 3 where it can be used for roller lamination and selectively retained in its pre-determined laminating position by its own retaining assembly.) The mounting of the second roller 6 is adjustable relative to the body of the flatbed laminator using the pneumatic cylinders 12a, 12b of the vertical movement assembly so that the second roller can be moved towards or away from the first roller 2 to change the size of the gap 10, while keeping parallel the axes of the first and second rollers 2, 6. The first and second rollers 2, 6 are arranged such that the gap 10 is aligned substantially with the upper surface of the flatbed 4. As a workpiece is fed through the gap 10 between the first and second rollers 2, 6 the workpiece will move onto and be supported by the flatbed 4, i.e., the workpiece is fed through the rollers from left to right as shown in FIG. 3 and the direction of rotation and counter rotation is indicated by the arrows.

A locking assembly can be operated to prevent movement of the second roller 6 towards the flatbed 4 during flatbed lamination or towards the first roller 2 during roller lamination so that the respective gap is maintained. The locking assembly can act on the vertical movement assembly. In one arrangement, the locking assembly can comprise a pair of mechanical locks 20a, 20b that engage with the respective piston rod 16a, 16b to prevent movement of the second roller towards the flatbed 4 or the first roller 2 depending on the position of the second roller 6. Each pair of mechanical locks 20a, 20b is pneumatically activated and is connected to a pressurised air supply 22. When pressurised air is supplied to a pair of mechanical locks 20a, 20b, they clamp onto the respective piston rod 16a, 16b to prevent further movement of the piston rod relative to the pneumatic cylinder 12a, 12b. Preferably, the mechanical locks 20a, 20b act on the respective piston rod 16a, 16b in one direction only—e.g., to prevent further movement of the piston rod end away from the pneumatic cylinder and hence prevent further movement of the second roller 6 towards the flatbed 4 or the first roller 2. Preferably, the mechanical locks 20a, 20b do not prevent movement of the piston rod end towards the pneumatic cylinder and hence do not prevent movement of the second roller 6 away from the flatbed 4 or the first roller 2. Each pair of mechanical locks 20a, 20b can be a pair of jaws that can be pivoted into engagement with the piston rod to clamp the piston rod between them. Other sorts of mechanical locks can also be used, including those that mechanical means or electro-mechanical means such as solenoids, for example.

The flatbed laminator according to the present invention can be configured and used in the following way. For flatbed lamination, a workpiece can be placed on the flatbed 4. The movable frame 14 is moved to position the second roller 6 over the workpiece. The gap between the second roller 6 and the flatbed 4 is adjusted, e.g., by activating the pneumatic cylinders 12a, 12b to lower the second roller until it contacts the upper surface of the workpiece. The mechanical locks 20a, 20b are activated to prevent further movement of the second roller 6 towards the flatbed 4. The movable frame 14 is then moved along the flatbed 4 so that the second roller 6 rolls over the workpiece to apply a vinyl coating or other laminating material while maintaining the gap between the second roller and the flatbed 4. When the second roller 6 is moved beyond the end of the workpiece it does not crush the edge of the workpiece nor will it impact the flatbed 4 of the laminator. This is prevented by the locking assembly acting to prevent the second roller 6 moving towards the flatbed 4.

For roller lamination, the second roller 6 is moved to the pre-determined laminating position by moving the movable frame 14 to the end of the flatbed 4 so that the second roller is directly over the first roller 2. The retaining assembly (not shown) is operated to selectively retain the second roller 6 in the pre-determined laminating position. (If the first roller 2 is initially in a storage position, it is also moved to its pre-determined laminating position.) The gap between the first and second rollers 2, 6 is adjusted, e.g., by activating the pneumatic cylinders 12a, 12b to lower the second roller. The mechanical locks 20a, 20b are activated to prevent further movement of the second roller 6 towards the first roller 2 to protect against crushing. The workpiece is then fed and drawn through the gap between the parallel, counter-rotating first and second rollers 2, 6 to apply a vinyl coating or other laminating material. After being drawn through the gap, the workpiece is moved on to, and supported by, the upper surface of the flatbed 4.

The invention claimed is:

1. A flatbed laminator for laminating a workpiece, the flatbed laminator comprising:
   a flatbed on which the workpiece can be positioned for flatbed lamination;
   a first roller; and
   a second roller mounted to be movable over the flatbed for flatbed lamination of the workpiece, and to be movable to a pre-determined laminating position where the first and second rollers are mounted in parallel for counter rotation and define a gap therebetween through which the workpiece is capable of being fed for roller lamination.

2. The flatbed laminator of claim 1, wherein the first roller is positioned at an end of the flatbed.

3. The flatbed laminator of claim 1, wherein the first roller is movable between a storage position and a pre-determined laminating position for the first roller where it is used for roller lamination.

4. The flatbed laminator of claim 3, further comprising a first retaining assembly that is selectively operable to retain the first roller in its pre-determined laminating position.

5. The flatbed laminator of claim 1, wherein the second roller is mounted on a horizontal movement assembly that is movable relative to the flatbed along a laminating direction.

6. The flatbed laminator of claim 5, further comprising a second retaining assembly that is selectively operable to retain the second roller in its pre-determined laminating position.

7. The flatbed laminator of claim 6, wherein operation of the second retaining assembly locks the horizontal movement assembly relative to the flatbed in the laminating direction.

8. The flatbed laminator of claim 5, wherein the second roller is mounted on the horizontal movement assembly by a vertical movement assembly.

9. The flatbed laminator of claim 8, further comprising a locking assembly that is selectively operable to prevent movement of the second roller towards the flatbed during flatbed lamination or towards the first roller during roller lamination.

10. The flatbed laminator of claim 9, wherein operation of the locking assembly locks the vertical movement assembly.

11. The flatbed laminator of claim 9, wherein operation of the locking assembly does not prevent movement of the second roller away from the flatbed or the first roller.

12. The flatbed laminator of claim 8, wherein the vertical movement assembly includes a pair of pneumatic cylinders with piston rods.

13. The flatbed laminator of claim 12, further comprising a locking assembly including a pair of mechanical locks and wherein operation of the locking assembly engages each mechanical lock with a respective piston rod to prevent movement of the second roller towards the flatbed during flatbed lamination or towards the first roller during roller lamination.

14. The flatbed laminator of claim 13, wherein operation of the locking assembly does not prevent movement of the second roller away from the flatbed or the first roller.

15. The flatbed laminator of claim 1, wherein at least one of the first roller and the second roller is a driven roller.

* * * * *